United States Patent
Kern et al.

(10) Patent No.: US 8,650,951 B2
(45) Date of Patent: Feb. 18, 2014

(54) MEASURING SPOONS AND CUPS

(75) Inventors: Elizabeth C. Kern, Minneapolis, MN (US); Paul H. C. Genberg, Minneapolis, MN (US); Rachel A. Jones, Minneapolis, MN (US)

(73) Assignee: Target Brands, Inc., Minneapolis, MN (US)

(*) Notice: Subject to any disclaimer, the term of this patent is extended or adjusted under 35 U.S.C. 154(b) by 287 days.

(21) Appl. No.: 13/038,892

(22) Filed: Mar. 2, 2011

(65) Prior Publication Data

US 2012/0222482 A1   Sep. 6, 2012

(51) Int. Cl.
*G01F 19/00* (2006.01)

(52) U.S. Cl.
USPC .......................................................... 73/426

(58) Field of Classification Search
USPC .......................................................... 73/426
See application file for complete search history.

(56) References Cited

U.S. PATENT DOCUMENTS

| | | | |
|---|---|---|---|
| 2,165,045 A | 7/1939 | Garside | |
| 2,654,252 A * | 10/1953 | Davis | 73/426 |
| 3,030,812 A | 4/1962 | Lutz | |
| 3,400,591 A | 9/1968 | Larson | |
| 3,526,138 A | 9/1970 | Swett et al. | |
| 4,043,203 A | 8/1977 | Montesi | |
| D255,973 S | 7/1980 | Morin | |
| D256,311 S | 8/1980 | Daenen | |
| 4,524,512 A | 6/1985 | Formo et al. | |
| D302,089 S | 7/1989 | Ancona et al. | |
| D303,056 S | 8/1989 | Prindle | |
| D318,600 S | 7/1991 | Lillelund et al. | |
| 5,137,316 A | 8/1992 | Foos | |
| D362,160 S | 9/1995 | Brabeck et al. | |
| D396,011 S | 7/1998 | Henriksson | |
| 5,797,507 A * | 8/1998 | Kramer | 220/4.23 |
| D437,793 S | 2/2001 | Kaposi et al. | |
| D438,125 S * | 2/2001 | Kaposi et al. | D10/46.2 |
| D440,164 S | 4/2001 | Kerr | |
| D443,836 S | 6/2001 | Wright | |
| D450,605 S | 11/2001 | Wright | |
| D495,964 S | 9/2004 | Overthun et al. | |
| D536,222 S | 2/2007 | Heiberg et al. | |
| D548,115 S | 8/2007 | Sawhney et al. | |
| D582,798 S | 12/2008 | Mantilla et al. | |

(Continued)

OTHER PUBLICATIONS

Ikea, "Insats Measuring cups, set of 4," p. 1 of 1, http://www.ikea.com/us/en/catalog/products/30085875 (last viewed Nov. 10, 2010).

*Primary Examiner* — Lisa Caputo
*Assistant Examiner* — Roger Hernandez-Prewitt
(74) *Attorney, Agent, or Firm* — Leanne Taveggia Farrell; Westman, Champlin & Koehler, P.A.

(57) ABSTRACT

A measuring utensil includes a handle portion and a measuring portion joined to the handle portion. The handle portion includes a main body, a male component and a female component. The main body has an upper surface and a lower surface and defines at least an outer perimeter of the handle portion. The male component is located within the outer perimeter of the main body and protrudes from the upper surface of the main body to a male engaging surface. The female component is located within the outer perimeter of the main body and is recessed from the lower surface of the main body in a direction towards the upper surface of the main body. The female component extends from the lower surface of the main body to a female engaging surface.

8 Claims, 12 Drawing Sheets

(56) References Cited

U.S. PATENT DOCUMENTS

| | | |
|---|---|---|
| D584,968 S | 1/2009 | Mantilla et al. |
| 7,716,842 B2 * | 5/2010 | Sumner-Trivisani et al. .. 30/324 |
| 7,753,206 B2 | 7/2010 | Sawhney et al. |
| D621,729 S | 8/2010 | Blust et al. |
| D624,836 S | 10/2010 | Blust et al. |
| 2010/0230319 A1 | 9/2010 | Thomson |
| 2012/0198930 A1 * | 8/2012 | Hood et al. .................... 73/429 |

\* cited by examiner

MEASURING SPOONS AND CUPS

BACKGROUND

Measuring spoons and cups are kitchen utensils for measuring volumes of liquid or dry food ingredients. Measuring spoons and measuring cups have a variety of different sizes, but can be sold together as a set. For example, a set of measuring spoons may include various incremental and fractional sizes of a teaspoon and a tablespoon measurement, and a set of measuring cups may include various incremental and fractional sizes of a cup measurement.

The discussion above is merely provided for general background information and is not intended to be used as an aid in determining the scope of the claimed subject matter.

SUMMARY

A measuring utensil includes a handle portion and a measuring portion joined to the handle portion. The handle portion includes a main body and at least a male component and a female component. The main body has an upper surface and a lower surface and defines at least an outer perimeter of the handle portion. The male component is located within the outer perimeter of the main body and protrudes from the upper surface of the main body to a male engaging surface. The female component is located within the outer perimeter of the main body and is recessed from the lower surface of the main body in a direction towards the upper surface of the main body. The female component extends from the lower surface of the main body to a female engaging surface.

The measuring utensil may be mated with other measuring utensils to form a set of measuring utensils. In such an embodiment, each measuring utensil includes the male and female components of the handle portion, of which each of the male and female components are substantially dimensionally similar to the other male and female components in the set. In addition, each measuring utensil includes the measuring portion, which is substantially dimensionally different to the other measuring utensils in the set. For example, the female engaging surface of a first measuring utensil is configured to mate with the male engaging surface of a second measuring utensil if a volume of the measuring vessel of the second measuring utensil is greater than a volume of the measuring vessel of the first measuring utensil.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

Embodiments described herein are directed to measuring utensils including a measuring spoon, being grouped together as a set of measuring spoons, and a measuring cup, being grouped together as a set of measuring cups. Each measuring spoon and each measuring cup include a handle portion and a measuring portion. The handle portion has an integral female component and an integral male component. The female component of each handle is capable of engaging with the male component of a different handle of a different measuring spoon or cup within the same set of measuring cups or measuring spoons.

Figure 1:
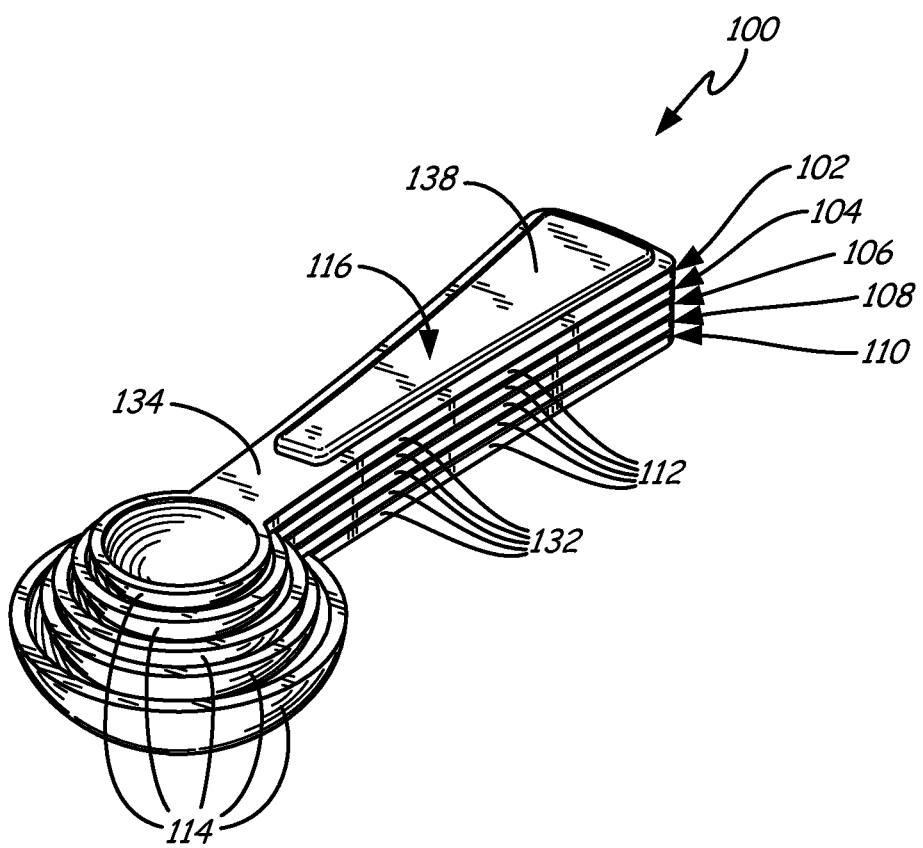
FIG. 1 illustrates a perspective view of a set of measuring spoons in accordance with one embodiment.
Figure 2:
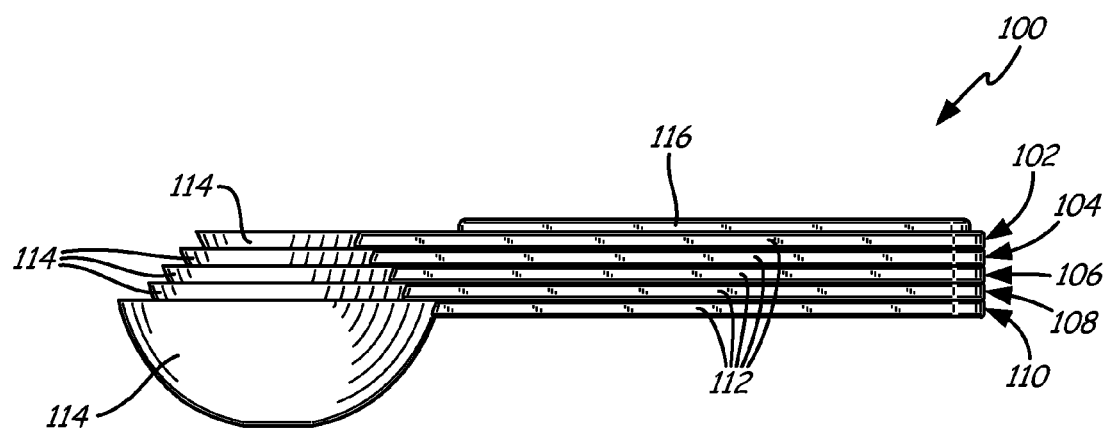
FIG. 2 illustrates a right side view of the set of measuring spoons illustrated in FIG. 1.
Figure 3:
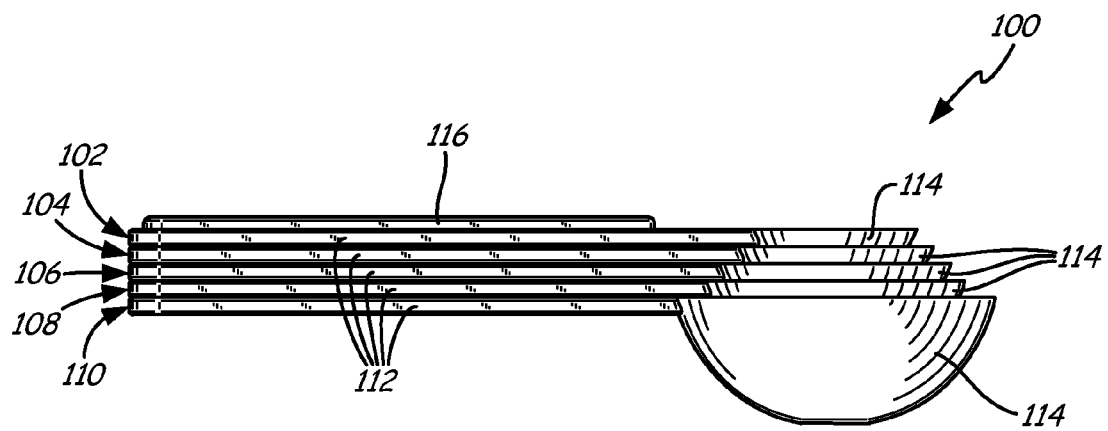
FIG. 3 illustrates a left side view of the set of measuring spoons illustrated in FIG. 1.
Figure 4:
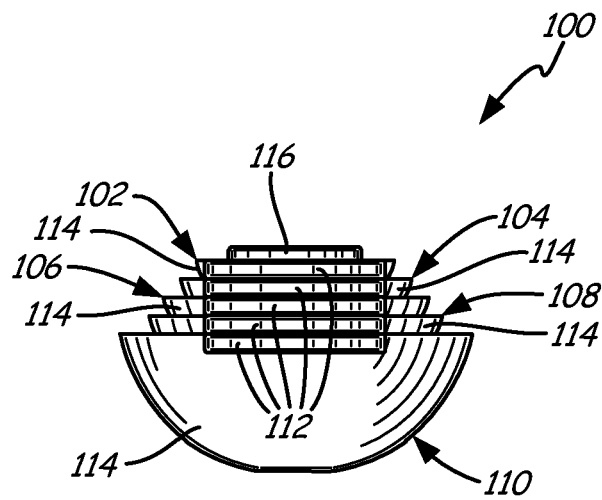
FIG. 4 illustrates a back view of the set of measuring spoons illustrated in FIG. 1.
Figure 5:
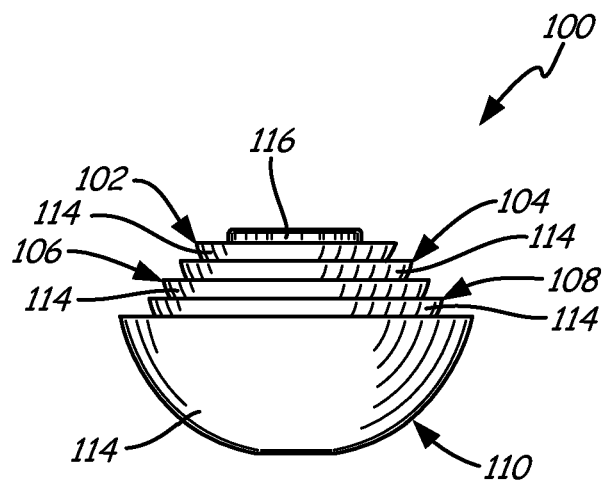
FIG. 5 illustrates a front view of the set of measuring spoons illustrated in FIG. 1.

FIG. 1 illustrates a perspective view of a set of measuring spoons 100 as grouped or coupled together and FIGS. 2-7 illustrate various elevation views of the set of measuring spoons 100 as grouped or coupled together in accordance with one embodiment. The elevation views include right side, left side, back, front, top and bottom views. In the embodiment illustrated in FIGS. 1-7, each measuring spoon 100, including all of its structural components, is made of the same material. For example, each measuring spoon 100 can be made of a polymer, such as plastic.

Figure 8:
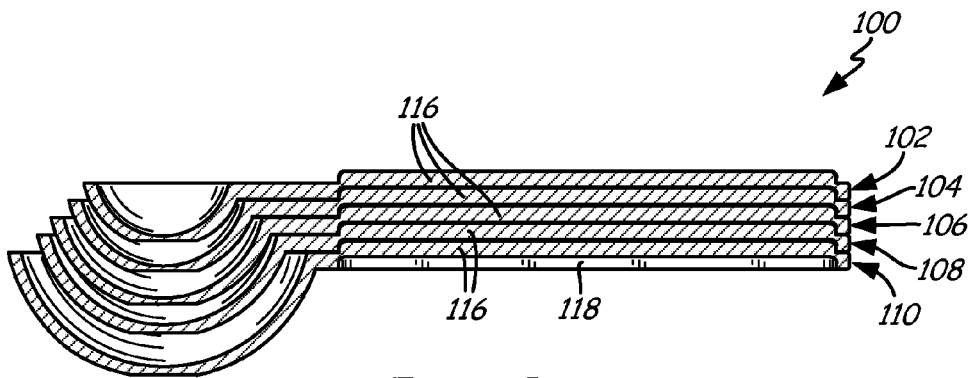
FIG. 8 illustrates a sectional view of the set of measuring spoons illustrated in FIG. 1.
Figure 9:
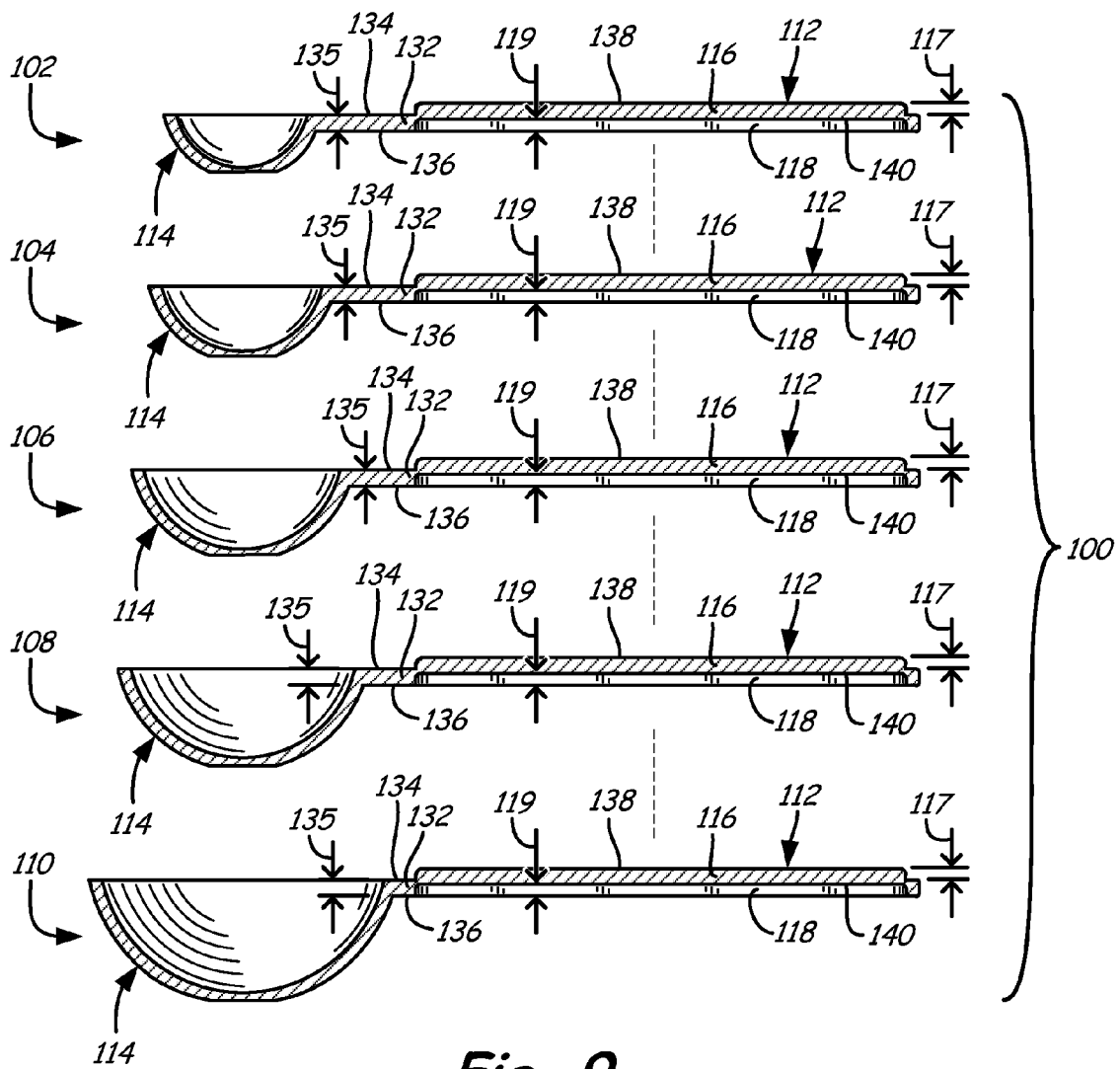
FIG. 9 illustrates an exploded sectional view of the set of measuring spoons illustrated in FIG. 1.

The set of measuring spoons 100 includes a first 102, a second 104, a third 106, a fourth 108 and a fifth 110 measuring spoon. Each of the measuring spoons 102, 104, 106, 108 and 110 include a handle portion 112 and a measuring portion or measuring vessel 114 joined with or integrally formed with the handle portion. As illustrated in FIGS. 1-7, the measuring portion 114 includes a bowl-shaped geometry along the entire depth of the volume with the bottom of the measuring portion 114 being substantially flat (FIGS. 8 and 9). Measuring portion 114 is capable of holding or measuring out a volume of liquid or dry material. The handle portion 112 includes an integral male component 116 and an integral female component (not illustrated in FIG. 1).

The amount of liquid or dry material that each of the measuring portions 114 of each measuring spoon can hold or measure varies and therefore each of the measuring portions 114 of each of the measuring spoons 102, 104, 106, 108 and 110 is substantially dimensionally different. For example, and as illustrated in FIGS. 1-7, measuring portion 114 of measuring spoon 102 can hold approximately ¼ teaspoon, measuring portion 114 of measuring spoon 104 can hold approximately ½ teaspoon, measuring portion 114 of measuring spoon 106 can hold approximately 1 teaspoon, measuring portion 114 of measuring spoon 108 can hold approximately ½ tablespoon and measuring portion 114 of measuring spoon 110 can hold approximately 1 tablespoon. It should be realized that the measuring portions 114 of each of measuring spoons 102, 104, 106, 108 and 110 can be other volumetric values including comparative metric values (i.e., milliliters) or other fractional or whole sizes.

Figure 6:
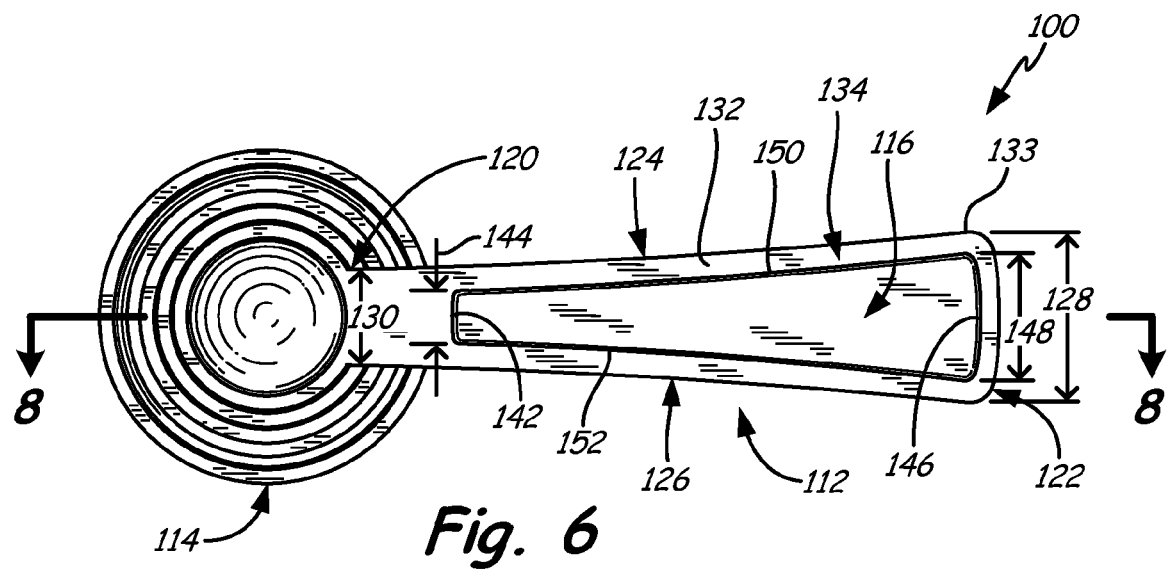
FIG. 6 illustrates a top view of the set of measuring spoons illustrated in FIG. 1.
Figure 7:
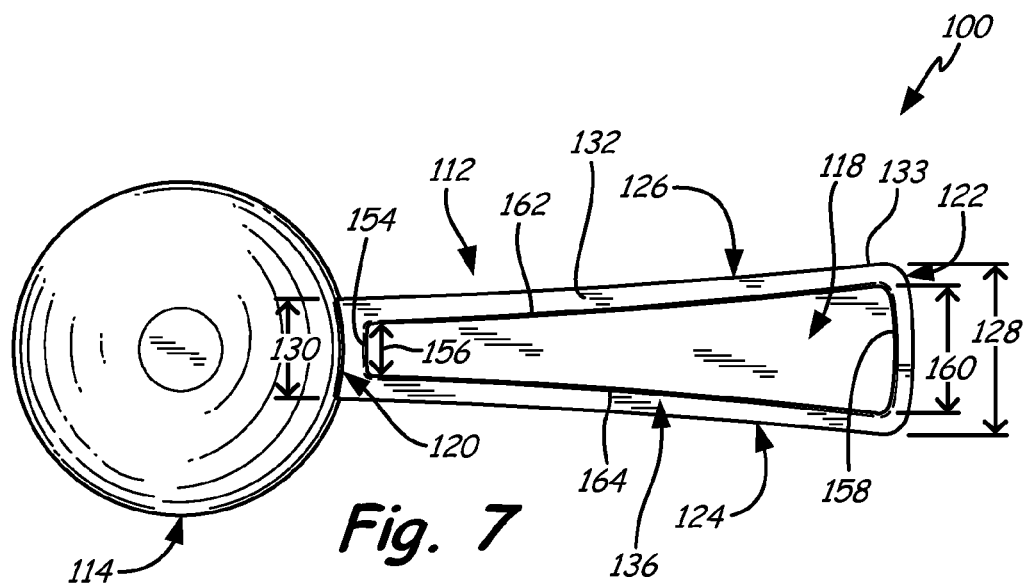
FIG. 7 illustrates a bottom view of the set of measuring spoons illustrated in FIG. 1.

As illustrated in detail in the top and bottom views of FIGS. 6 and 7, handle portions 112 have substantially uniform shapes and substantially dimensionally similar geometries across each measuring spoon 102, 104, 106, 108 and 110. As discussed in this paragraph, each handle portion 112 of each measuring spoon includes substantially dimensionally similar geometries in terms of proximal ends, distal ends and opposing side edges of handle portions 112. Each handle portion 112 includes a proximal end 120 formed integrally with the measuring portion 114, a distal end 122 and a pair of opposing side edges 124 and 126. As illustrated in the bottom view of FIG. 7, proximal end 120 is a curved end that follows the curve of the geometry of the measuring portion 114. Each distal end 122 includes a width 128 that is greater than a width 130 of proximal end 120. For example, width 128 of each measuring spoon can range between approximately 0.960 inches (24.384 mm) and 0.965 inches (24.511 mm). More specifically, width 128 is approximately 0.960 inches (24.384 mm). For example, width 130 of each measuring spoon can range between approximately 0.500 inches (12.700 mm) and 0.530 inches (13.462 mm). More specifically, width 130 is approximately 0.525 inches (13.335 mm). In addition, distal end 122 includes a convex-shaped curved end that can be similar or different than the radius of curvature of the proximal end 120. Between distal end 122 and proximal end 120, side edges 124 and 126 taper. Each of these tapered edges 124 and 126 includes a concave-shaped radius of curvature. Therefore, as illustrated in FIGS. 1-7, rather than edges 124 and 126 being linear edges located between proximal end 120 and distal end 122, edges 124 and 126 are curved. However, other types of tapered edges may be used, for example, convex-shaped and linear-shaped edges may be used.

FIG. 8 illustrates a sectional view of the set of measuring spoons 100 as grouped or coupled together and taken along the line illustrated in FIG. 6. FIG. 9 illustrates an exploded sectional view of the set of measuring spoons 100 dissembled from each other. As illustrated in FIG. 9, the handle portions 112 of each measuring spoon 102, 104, 106, 108 and 110 includes a base or main body 132 having an upper surface 134 and a lower surface 136. Main body 132 includes a thickness 135 that ranges between approximately 0.085 inches (2.159 mm) and 0.110 inches (2.794 mm). In particular, distance 135 is approximately 0.104 inches (2.642 mm). Main body 132 defines at least an outer perimeter 133 (FIGS. 6 and 7) of handle portion 112.

FIGS. 6-9 show in detail male components 116 and female components 118 of each measuring spoon 102, 104, 106, 108 and 100 and their relationship to main body 132 of handle portion 112. As discussed in this paragraph, each male component 116 of each measuring spoon includes substantially dimensionally similar geometries in terms of protrusion distance and each female component 118 of each measuring spoon includes substantially dimensionally similar geometries in terms of recessed distance. As illustrated, male component 116 and female component 118 are both formed within the outer perimeter 133 of handle portion 112 and continuously and integrally with the material of main body 132 and therefore the material of each measuring spoon 102, 104, 106, 108 and 110. Male component 116 protrudes from upper surface 134 of main body 132 by a distance 117. For example, distance 117 can range between approximately 0.060 inches (1.524 mm) and 0.075 inches (1.905 mm). In particular, distance 117 is approximately 0.073 inches (1.852 mm). In other words, male component 116 extends from upper surface 134 of main body 132 to a male engaging surface 138. The spaced distance between upper surface 134 and male engaging surface 138 can be approximately 0.073 inches (1.860 mm). In addition, male component 116 protrudes from upper surface 134 of main body 132 at a draft for ease in injection molding separation. For example, the draft angle can be three degrees.

Female component 118 is recessed from lower surface 136 in a direction towards the upper surface 134 of main body 132 by a distance 119. For example, distance 119 can range between approximately 0.060 inches (1.524) and 0.075 inches (1.905 mm). In particular, distance 117 is approximately 0.075 inches (1.905 mm). In other words, the recess of female component 118 extends from lower surface 136 and into main body 132 to a female engaging surface 140. The spaced distance 119 between lower surface 136 and female engaging surface 140 is approximately 0.075 inches (1.905 mm). As illustrated, distance 119 is less than thickness 135 of main body 132. In addition, female component 118 is recessed from lower surface 136 of main body 132 at a draft for ease in injection molding separation. For example, the draft angle can be three degrees.

Male component 116 and female component 118 also include proximal and distal ends as well as opposing side edges. As discussed in this paragraph, the male components 116 of each measuring spoon include substantially dimensionally similar geometries in terms of proximal ends, distal ends and opposing side edges and the female components 118 of each measuring spoon include substantially dimensionally similar geometries in terms of proximal ends, distal ends and opposing side edges. Each opposing side edge 150 and 152 extends from the proximal and distal ends of male component 116 and female component 118 and correspond with the proximal and distal ends 120 and 122 and opposing side edges 124 and 126 (FIGS. 6 and 7) of handle portion 112. More particular, proximal end 142 (FIG. 6) of male component 116 is located proximate to measuring portion 114 and includes a width 144. Width 144 can range between approximately 0.280 inches (7.112 mm) and 0.300 inches (7.620 mm). In particular, width 144 is approximately 0.297 inches (7.544 mm). Distal end 146 of male component 116 is located proximate to distal end 122 and includes a width 148. Width 148 can range between approximately 0.700 inches (17.780 mm) and 0.720 inches (18.288 mm). In particular, width 148 is approximately 0.712 inches (18.050 mm). The width 148 of distal end 146 is greater than the width 144 of proximal end 142. Similar to distal end 122 of handle portion 112, distal end 146 of male component 116 includes a convex-shaped curved edge. Between distal end 146 and proximal end 142 of male component 116, opposing side edges 150 and 152 of male component 116 taper. Each of these tapered edges 150 and 152 includes a concave-shaped radius of curvature that substantially matches the tapered edges 124 and 126 of handle portion 112. Therefore, as illustrated in FIG. 6, rather than edges 150 and 152 being linear edges located between proximal end 142 and distal end 146, edges 150 and 152 are curved. However, other types of tapered edges 150 and 152 may be used, for example, convex-shaped and linear-shaped edges may be used.

Proximal end 154 (FIG. 6) of female component 118 is located proximate to measuring portion 114 and includes a width 156. Width 156 can range between approximately 0.280 inches (7.112 mm) and 0.300 inches (7.620 mm). In particular, width 156 is approximately 0.285 inches (7.239 mm). Distal end 158 of female component 118 is located proximate distal end 122 and includes a width 160. Width 160 can range between approximately 0.700 inches (17.780 mm) and 0.710 inches (18.034 mm). In particular, width 160 is approximately 0.702 inches (17.831 mm). Width 160 of distal end 158 is greater than width 156 of proximal end 154. Similar to distal end 122 of handle portion 112, distal end 158 of female component 118 includes a convex-shaped curved edge. In one embodiment, the convex-shaped distal end of female component 118 is substantially similar to the convex-shaped distal end of male component 116. Between distal end 158 and proximal end 154, opposing side edges 162 and 164 of female component 118 taper. Each of these tapered edges 162 and 164 includes a concave-shaped radius of curvature that substantially matches the tapered edges 150 and 152 of male component 116 and the tapered edges 124 and 126 of handle portion 112. Therefore, rather than edges 162 and 164 being linear edges located between proximal end 154 and distal end 158, edges 162 and 164 are curved. However, other types of tapered edges 162 and 164 may be used, for example, convex-shaped and linear-shaped edges may be used.

Figure 10:
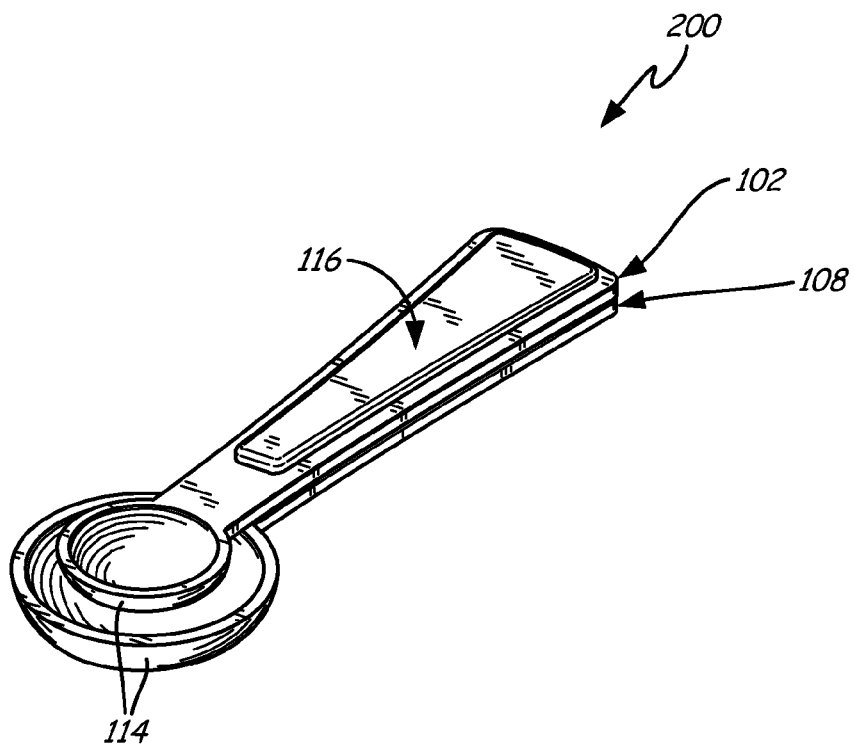
FIG. 10 illustrates a perspective view of an alternative coupling of measuring spoons in accordance with another embodiment.
Figure 11:
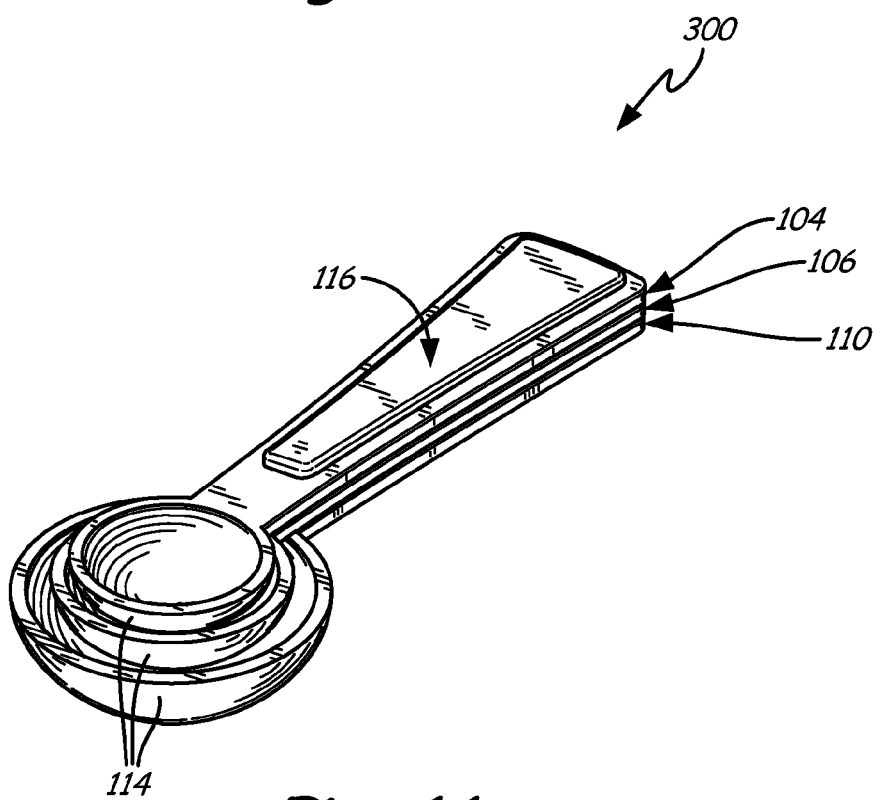
FIG. 11 illustrates a perspective view of an alternative coupling of measuring spoons in accordance with yet another embodiment.

As described above, the geometry and relative dimensions of male and female components 116 and 118 of each measuring spoon 102, 104, 106, 108 and 110, which are each made of the same material, allows the measuring spoons to mate by locking together into a frictional or transitional fit. More specifically, the fit between the male and female components 116 and 118 along their corresponding proximal and distal ends and along their tapered edges holds the measuring spoons securely together, but not so securely that the measuring spoons cannot be disassembled or be removably locked together. In one embodiment and as illustrated in FIGS. 1-8, the female component 118 of the smallest measuring portion 114 of measuring spoon 102 mates with the male component 116 of the next larger sized measuring portion 114 of a measuring spoon until all measuring spoons are mated or locked together to form a grouping or set of measuring spoons 100. In other embodiments and as illustrated in FIGS. 10 and 11, the geometry of male and female components 116 and 118 allow a subset of the measuring spoons shown in FIGS. 1-9 to mate or lock together. As long as the female component 118 of a select spoon mates with the male component 116 of a larger sized spoon, any two or more of the measuring spoons shown in FIGS. 1-9 may be mated together even if one or more intervening spoon sizes are not present. Thus, all possible subsets of measuring spoons may be mated together as long as the spoon with the smallest measuring portion 114 is located on top and the remaining spoons in the subset fit together below the top spoon in increasing volume order with the male component 116 of the larger spoon mated with the female component 118 of the spoon above it.

For example, in FIG. 10, the male and female components 116 and 118 (hidden from view in FIG. 10) of measuring spoons 102 and 108 can be mated or locked together to form a set of measuring spoons 200, while in FIG. 11, the male and female components 116 and 118 (hidden from view in FIG. 11) of measuring spoons 104, 106 and 110 can be mated or locked together to form a set of measuring spoons 300. It should be realized that there are a variety of ways in which measuring spoons can be mated together other than in the embodiments illustrated in FIGS. 1-8 and 10-11 as long as the smallest spoon (i.e., measuring portion 114) of the subset is located on a top of a stack or set of any number or measuring spoons and the largest spoon (i.e., measuring portion 114) of the subset is located on a bottom of a stack or set of any number of measuring spoons.

Figure 12:
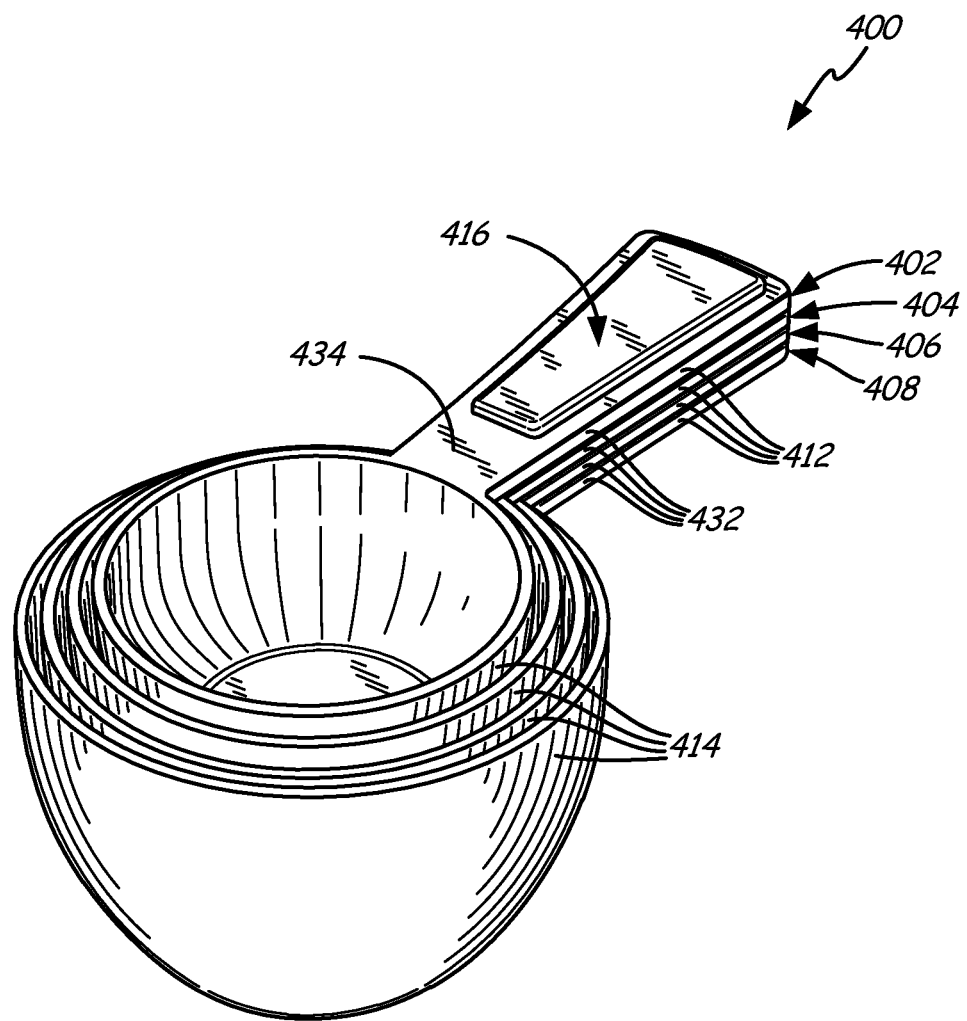
FIG. 12 illustrates a perspective view of a set of measuring cups in accordance with one embodiment.
Figure 13:
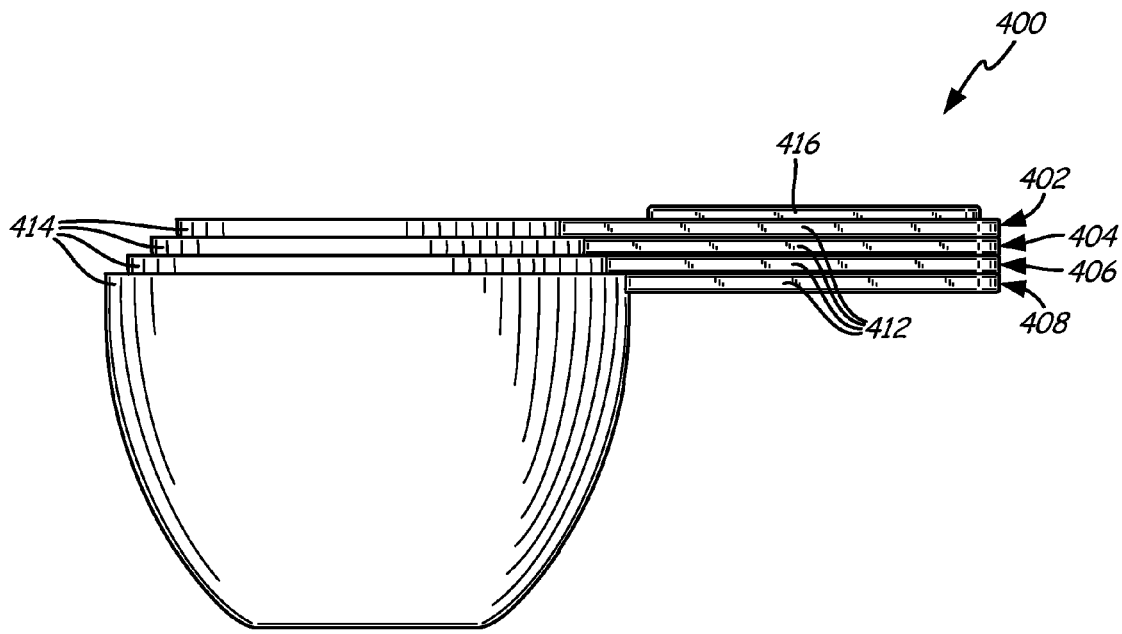
FIG. 13 illustrates a right side view of the set of measuring cups illustrated in FIG. 12.
Figure 14:
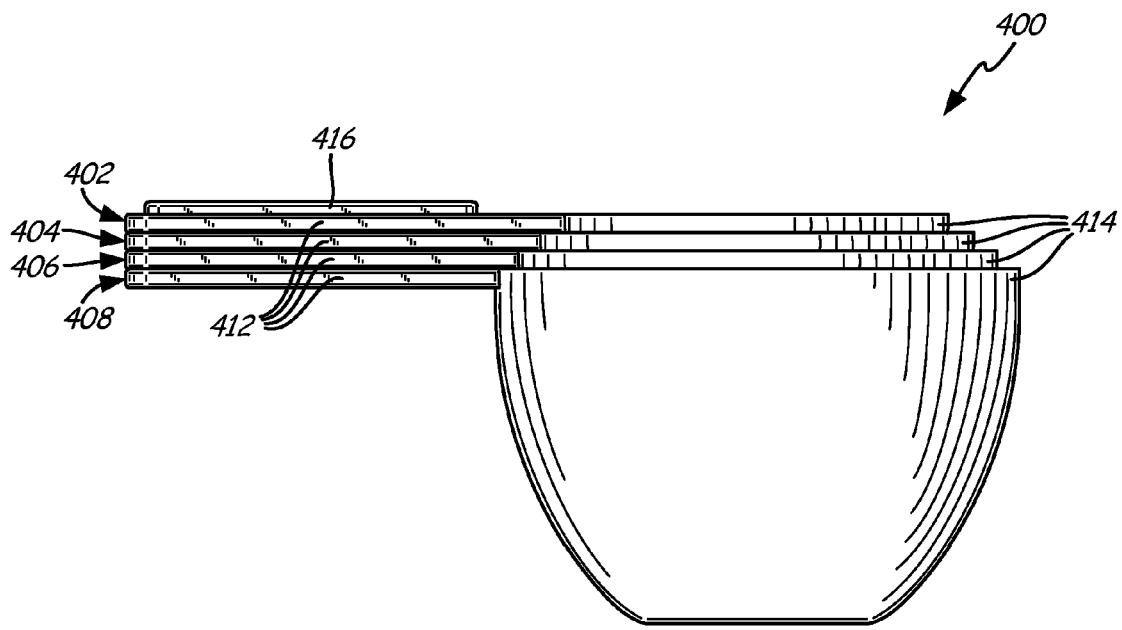
FIG. 14 illustrates a left side view of the set of measuring cups illustrated in FIG. 12.
Figure 15:
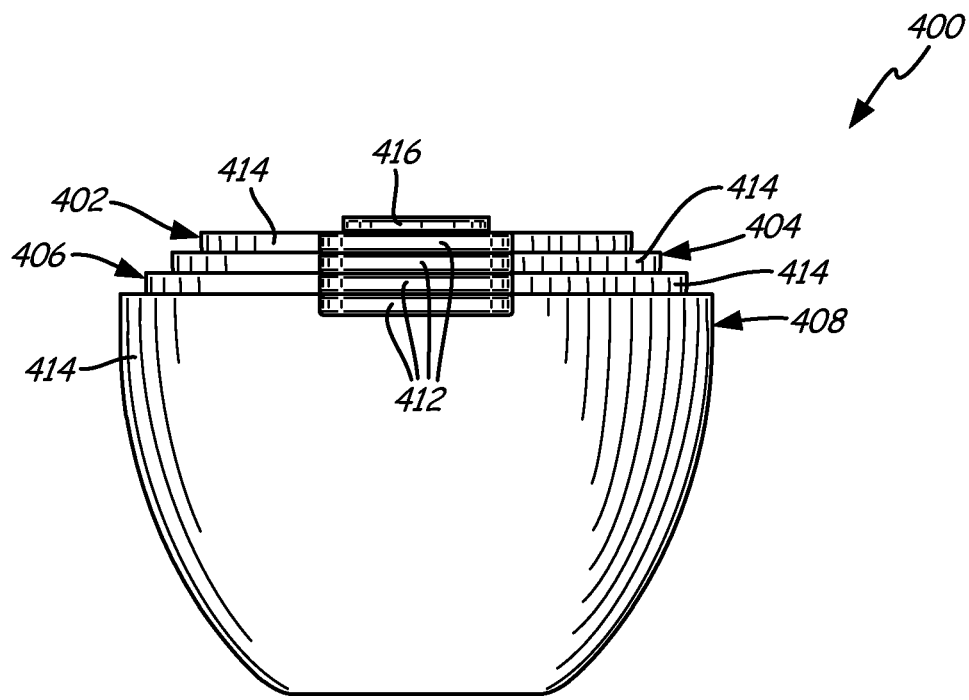
FIG. 15 illustrates a back view of the set of measuring cups illustrated in FIG. 12.
Figure 16:
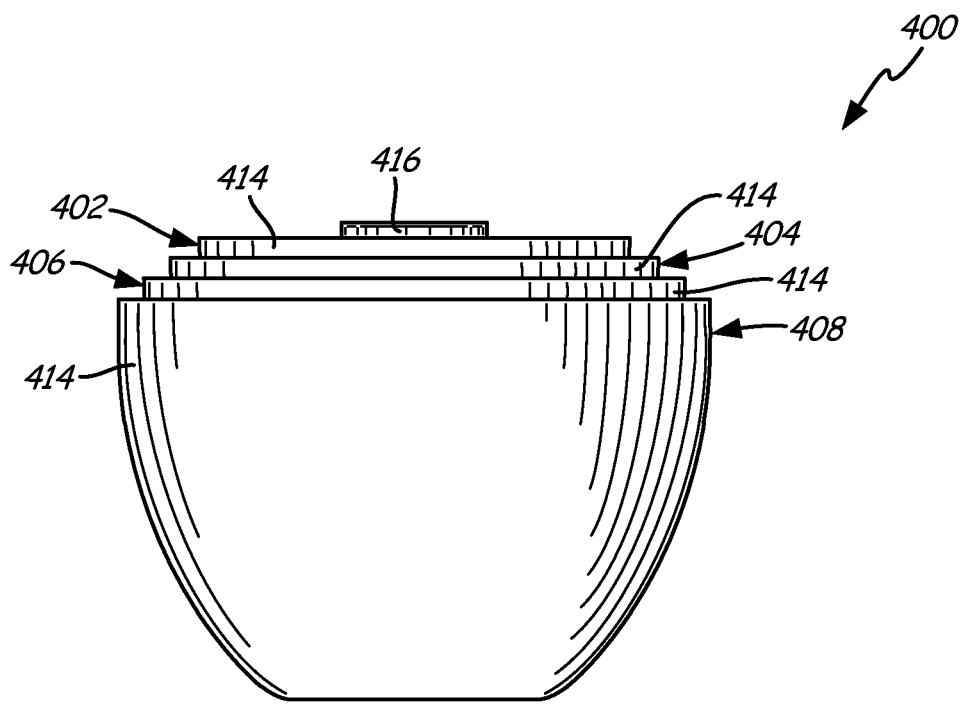
FIG. 16 illustrates a front view of the set of measuring cups illustrated in FIG. 12.

FIG. 12 illustrates a perspective view of a set of measuring cups 400 as grouped or coupled together and FIGS. 13-18 illustrate various elevation views of the set of measuring cups 400 as grouped or coupled together in accordance with one embodiment. The elevation views include right side, left side, back, front, top and bottom views. In the embodiment illustrated in FIGS. 12-18, each measuring cup 400, including all of its structural components, is made of the same material. For example, each measuring cup 400 can be made of a polymer, such as plastic.

Figure 19:
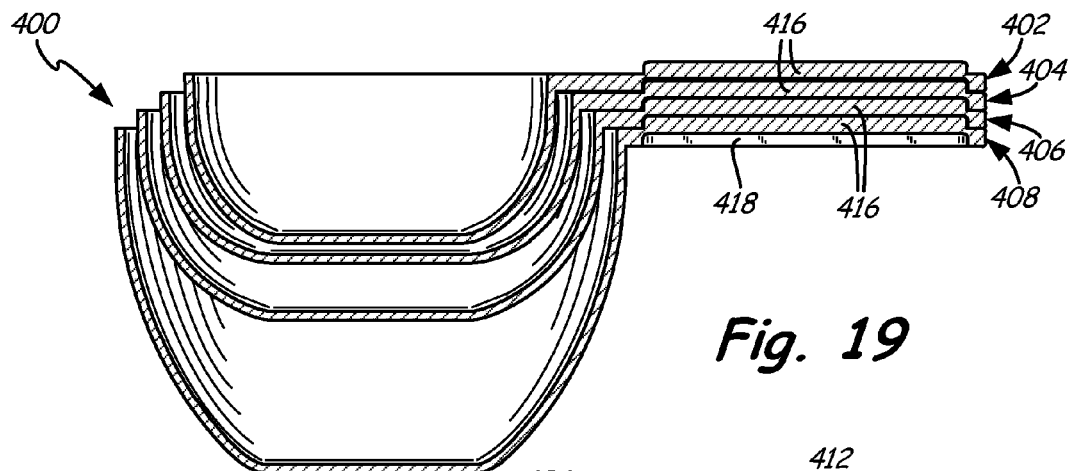
FIG. 19 illustrates a sectional view of the set of measuring cups illustrated in FIG. 12.
Figure 20:
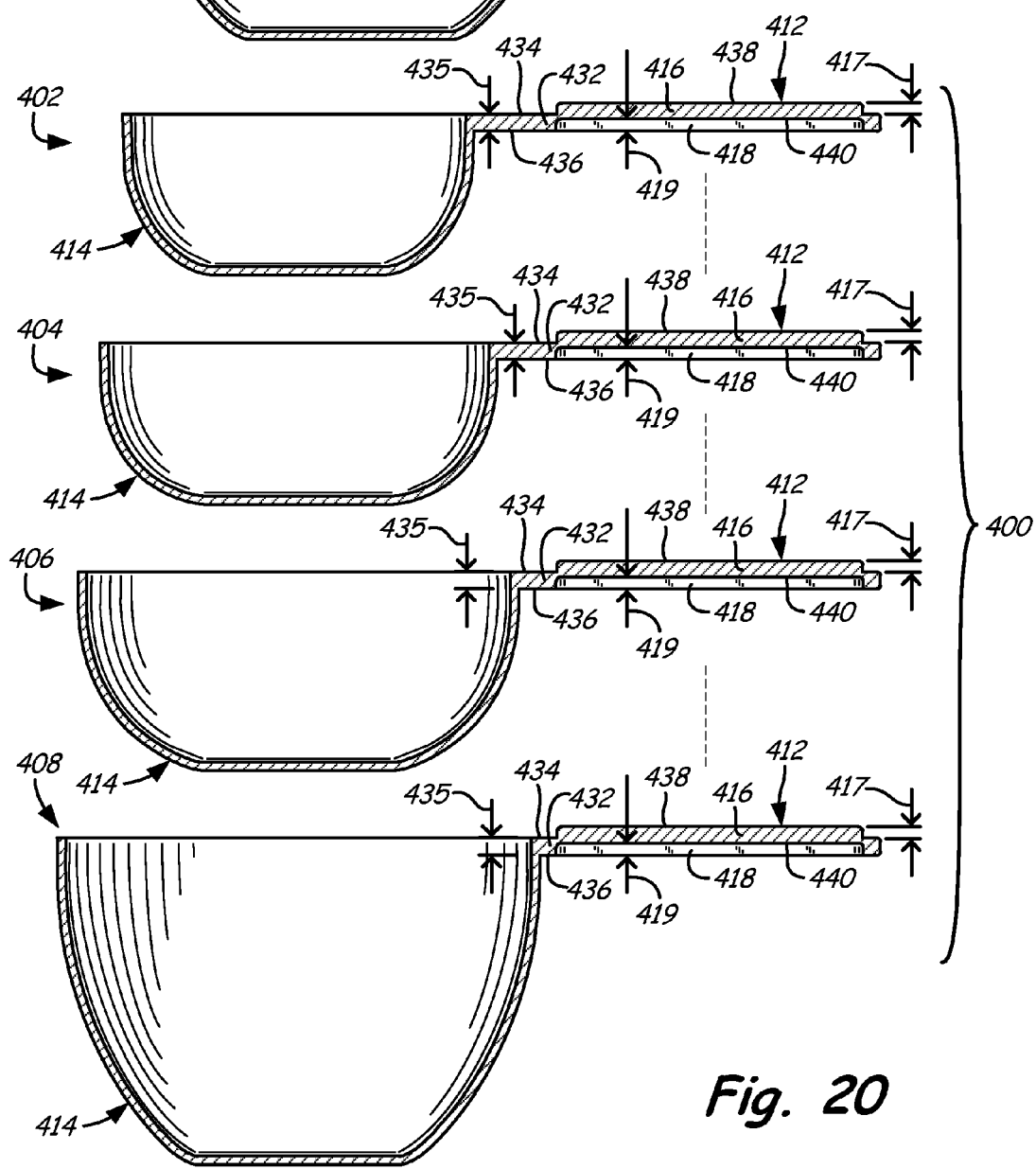
FIG. 20 illustrates an exploded sectional view of the set of measuring cups illustrated in FIG. 12.

The set of measuring cups 400 includes a first 402, a second 404, a third 406 and a fourth 408 measuring cup. Each of the measuring cups 402, 404, 406 and 408 include a handle portion 412 and a measuring portion or measuring vessel 414 joined or integrally formed with the handle portion. As illustrated in FIGS. 12-18, the measuring portion 414 includes a bowl-shaped geometry along the entire depth of the volume with the bottom of the measuring portion 114 being substantially flat (FIGS. 19 and 20). Measuring portion 414 is capable of holding or measuring out a volume of liquid or dry material. The handle portion 412 includes an integral male component 416 and an integral female component (not illustrated in FIG. 12).

The amount of liquid or dry material that each of the measuring portions 414 of each measuring spoon can hold or measure varies and therefore each of the measuring portions 414 of each of the measuring cups 402, 404, 406 and 408 are substantially dimensionally different. For example, and as illustrated in FIGS. 12-18, measuring portion 414 of measuring cup 402 can hold approximately ¼ cup, measuring portion 414 of measuring cup 404 can hold approximately ⅓ cup, measuring portion 414 of measuring cup 406 can hold approximately ½ cup and measuring portion 414 of measuring cup 408 can hold approximately 1 cup. It should be realized that the measuring portions 414 of each of measuring cups 402, 404, 406 and 408 can be other volumetric values including comparative metric values (i.e., milliliters) or other fractional or whole sizes.

Figure 17:
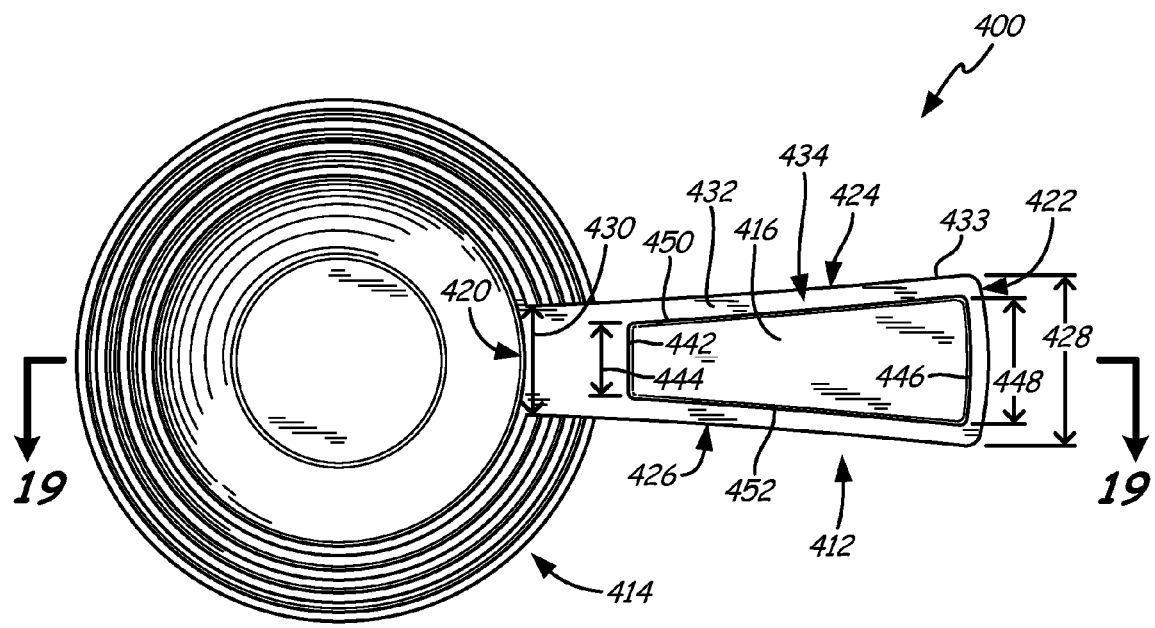
FIG. 17 illustrates a top view of the set of measuring cups illustrated in FIG. 12.
Figure 18:
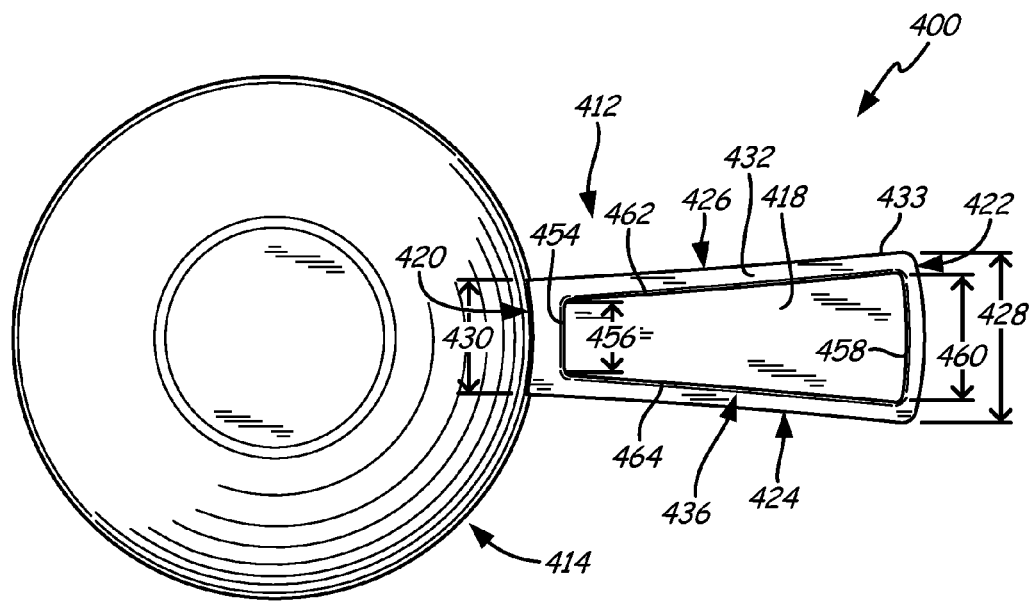
FIG. 18 illustrates a bottom view of the set of measuring cups illustrated in FIG. 12.

As illustrated in detail in the top and bottom views of FIGS. 17 and 18, handle portions 412 have a substantially uniform shape and substantially dimensionally similar geometries across each measuring cup 402, 404, 406 and 408. As discussed in this paragraph, each handle portion 412 of each measuring cup includes substantially dimensionally similar geometries in terms of proximal ends, distal ends and opposing side edges of handle portions 412. Each handle portion includes a proximal end 420 formed integrally with the measuring portion 414, a distal end 422 and a pair of opposing side edges 424 and 426. As illustrated in the bottom view of FIG. 18, proximal end 420 is a curved end that follows the curve of the geometry of the measuring portion 414. Distal end 422 includes a width 428 that is greater than a width 430 of proximal end 420. For example, width 428 of each measuring spoon can range between approximately 1.100 inches (27.940 mm) and 1.120 inches (28.448 mm). More specifically, width 428 is approximately 1.100 inches (27.940 mm). For example, width 430 of each measuring spoon can range between approximately 0.690 inches (17.526 mm) and 0.700 inches (17.780 mm). More specifically, width 430 is approximately 0.695 inches (17.653 mm). In addition, distal end 422 includes a convex-shaped curved end that can be similar or different than the radius of curvature of the proximal end 420. Between distal end 422 and proximal end 420, side edges 424 and 426 taper. Each of these tapered edges 424 and 426 includes a convex-shaped radius of curvature. Therefore, as illustrated in FIGS. 12-18, rather than edges 424 and 426 having a linear edge located between proximal end 420 and distal end 422, edges 424 and 426 are curved. However, other types of tapered edges 424 and 426 may be used, for example, convex-shaped and linear-shaped edges may be used.

FIG. 19 illustrates a sectional view of the set of measuring cups 400 as grouped or coupled together and taken along the line illustrated in FIG. 17. FIG. 20 illustrates an exploded sectional view of the set of measuring cups 400 disassembled from each other or removably locked together. As illustrated in FIGS. 12 and 20, the handle portions 412 of each measuring cup 402, 404, 406 and 408 includes a base or main body 432 having an upper surface 434 and a lower surface 436. Main body 432 includes a thickness 435 that ranges between approximately 0.110 inches (2.794 mm) and 0.120 inches (3.048 mm). In particular, distance 435 is approximately 0.115 inches (2.921 mm). Main body 432 defines at least the outer perimeter 433 (FIGS. 17 and 18) of handle portion 412.

FIGS. 17-20 show in detail male component 416 and female component 418 and their relationship to main body 432 of handle portion 412. As discussed in this paragraph, each male component 416 of each measuring cup includes substantially dimensionally similar geometries in terms of protrusion distance and each female component 418 of each measuring cup includes substantially dimensionally similar geometries in terms of recessed distance. As illustrated, male component 416 and female component 418 are both formed within the outer perimeter 433 of handle portion 412 and continuously and integrally with the material of main body 432 and therefore the material of each measuring spoon 402, 404, 406 and 408. Male component 416 protrudes from upper surface 434 of main body 432 by a distance 417. For example, distance 417 can range between approximately 0.060 inches (1.524 mm) and 0.075 inches (1.905 mm). In particular, distance 417 is approximately 0.071 inches (1.803 mm). In other words, male component 416 extends from upper surface 434 of main body 432 to a male engaging surface 438. The spaced distance 417 between upper surface 434 and male engaging surface 438 is approximately 0.074 inches (1.880 mm). In addition, male component 416 protrudes from upper surface 434 of main body 432 at a draft for ease in injection molding separation. For example, the draft angle can be three degrees.

Female component 418 is recessed from lower surface 436 in a direction towards the upper surface 434 of main body 432 by a distance 419. For example, distance 419 can range between approximately 0.060 inches (1.524 mm) and 0.075 inches (1.905 mm). In particular, distance 419 is approximately 0.071 inches (1.803 mm). In other words, the recess of female component 418 extends from lower surface 436 and into main body 432 to female engaging surface 440. The spaced distance 419 between lower surface 436 and female engaging surface 440 is approximately 0.074 inches (1.880 mm). Distance 419 is less than thickness 435 of main body 432. In addition, female component 418 is recessed from lower surface 436 of main body 432 at a draft for ease in injection molding separation. For example, the draft angle can be three degrees.

Male component 416 and female component 418 also include proximal and distal ends as well as opposing side edges. As discussed in this paragraph, the male components 416 of each measuring cup include substantially dimensionally similar geometries in terms of proximal ends, distal ends and opposing side edges and the female components 418 of each measuring cup include substantially dimensionally similar geometries in terms of proximal ends, distal ends and opposing side edges. Each opposing side edge 450 and 452 extends from the proximal and distal ends of male component 416 and female component 418 and correspond with the proximal and distal ends 420 and 422 and opposing side edges 424 and 426 (FIGS. 17 and 18) of handle portion 412. More particular, proximal end 442 (FIG. 17) of male component 416 is located proximate to measuring portion 414 and includes a width 444. Width 444 can range between approximately 0.450 inches (11.430 mm) and 0.470 inches (11.938). In particular, distance 444 is approximately 0.468 inches (11.887 mm). Distal end 446 of male component 416 is located proximate distal end 422 and includes a width 448. Width 448 can range between approximately 0.800 inches (20.320 mm) and 0.850 inches (21.590). In particular, distance 448 is approximately 0.805 inches (20.447 mm). The width 448 of distal end 446 is greater than the width 444 of proximal end 442. Similar to distal end 422 of handle portion 412, distal end 446 of male component 416 includes a convex-shaped curved edge. Between distal end 446 and proximal end 442 of male component 416, opposing side edges 450 and 452 of male component 416 taper. Each of these tapered edges 450 and 452 includes a concave-shaped radius of curvature that substantially matches the tapered edges 424 and 426 of handle portion 412. Therefore, as illustrated in FIG. 17, rather than edges 450 and 452 being linear edges located between proximal end 442 and distal end 446, edges 450 and 452 are curved. However, other types of tapered edges 450 and 452 may be used, for example, convex-shaped and linear-shaped edges may be used.

Proximal end 454 (FIG. 18) of female component 418 is located proximate to measuring portion 414 and includes a width 456. Width 456 can range between approximately 0.440 inches (11.176 mm) and 0.460 inches (11.684 mm). In particular, width 456 is approximately 0.447 inches (11.354 mm). Distal end 458 of female component 418 is located proximate distal end 422 and includes a width 460. Width 460 can range between approximately 0.800 inches (20.320 mm) and 0.850 inches (21.590 mm). In particular, width 460 is approximately 0.805 inches (20.447 mm). Width 460 of distal end 458 is greater than width 456 of proximal end 454. Similar to distal end 422 of handle portion 412 and distal end 446 of male component 416, distal end 458 of female component 418 includes a convex-shaped curved edge. In one embodiment, the convex-shaped distal end of female component 418 is substantially similar to the distal end of male component 416. Between distal end 458 and proximal end 454, opposing side edges 462 and 464 of female component 418 taper. Each of these tapered edges 462 and 464 includes a concave-shaped radius of curvature that substantially matches the tapered edges 424 and 426 of handle portion 412 as well as tapered edges 450 and 452 of male component 416.

Therefore, rather than edges 462 and 464 being linear edges located between proximal end 454 and distal end 458, edges 462 and 464 are curved. However, other types of tapered edges 462 and 464 may be used, for example, convex-shaped and linear-shaped edges may be used.

Figure 21:
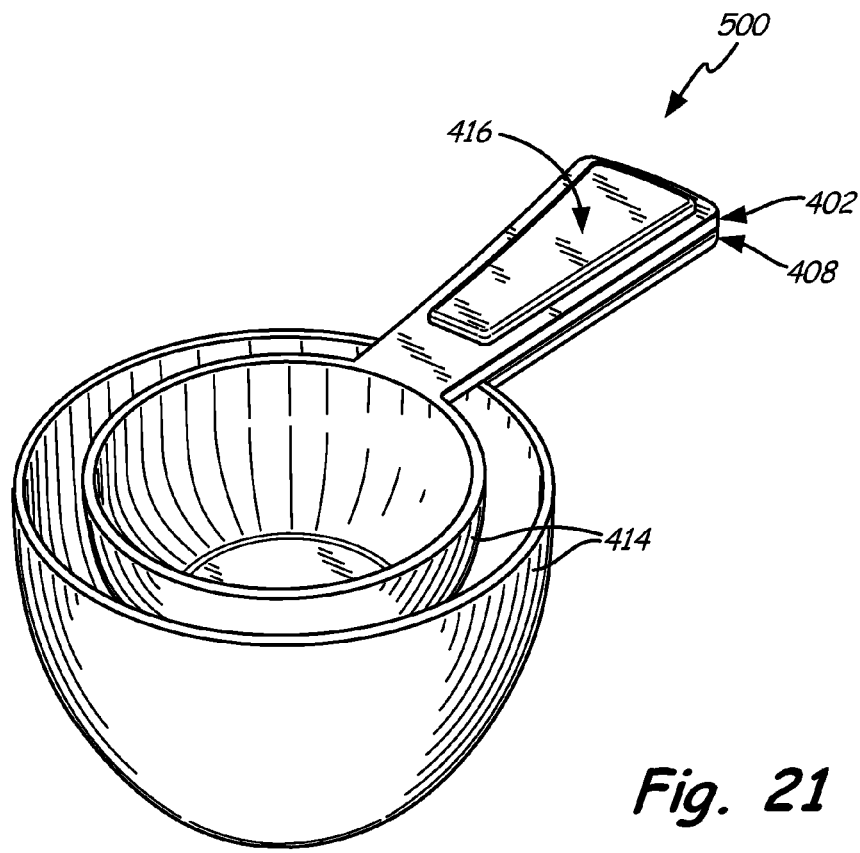
FIG. 21 illustrates a perspective view of an alternative coupling of measuring cups in accordance with another embodiment.
Figure 22:
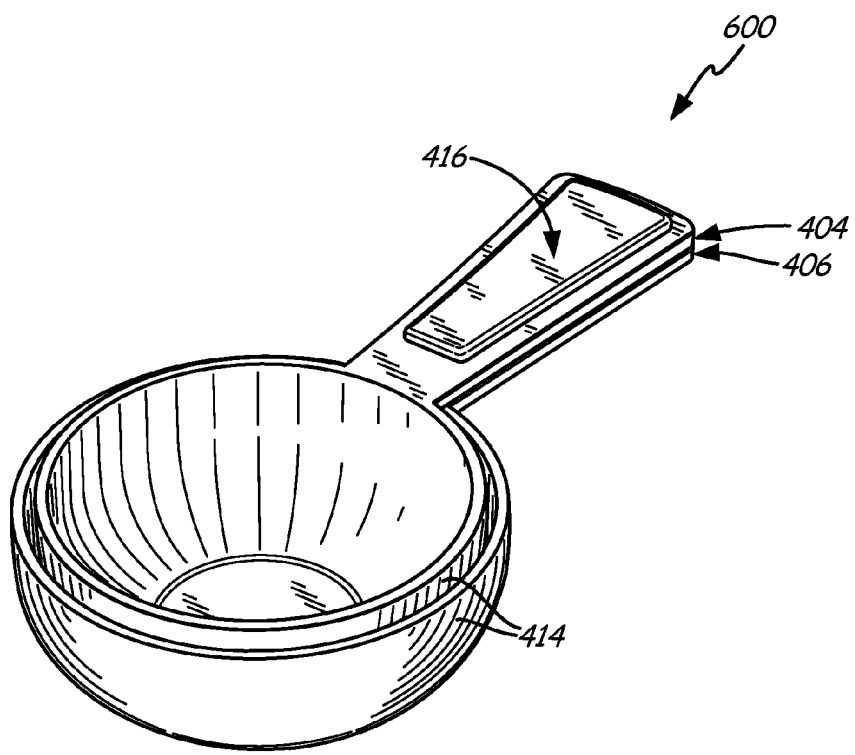
FIG. 22 illustrates a perspective view of an alternative coupling of measuring cups in accordance with yet another embodiment.

As described above, the geometry and relative dimensions of male and female components 416 and 418 of each measuring cup 402, 404, 406 and 408, which are each made of the same material, allows the measuring cups to mate by locking together into a frictional or transition fit. More specifically, the fit between the male and female components 416 and 418 are located along their corresponding proximal and distal ends and along their tapered edges to hold the measuring cups securely together, but not so securely that the measuring cups cannot be disassembled. In one embodiment and as illustrated in FIGS. 12-19, the female component 418 of the smallest measuring portion 414 of measuring cup 402 mates with the male component 416 of the next larger sized measuring cup until all measuring cups are mated or locked together to form a grouping or set of measuring cups 400. In other embodiments and as illustrated in FIGS. 21 and 22, the geometry of male and female components 416 and 418 allow a subset of the measuring cups shown in FIGS. 12-19 to mate or lock together. As long as the female component 418 of a select cup mates with the male component 416 of a larger sized cup, any two or more of the measuring cups shown in FIGS. 12-19 may be mated together even if one or more intervening cup sizes are not present. Thus, all possible subsets of the measuring cups may be mated together as long as the cup with the smallest measuring portion 414 is located on top and the remaining cups in the subset fit together below the top cup in increasing volume order with the male component 416 of the larger cup mated with the female component 418 of the cup above it.

For example, in FIG. 21, the male and female components 416 and 418 (hidden from view in FIG. 21) of measuring cups 402 and 408 can be mated or locked together to form a set of measuring cups 500, while in FIG. 22, the male and female components 416 and 418 (hidden from view in FIG. 22) of measuring cups 404 and 406 can be mated or locked together to form a set of measuring cups 600. It should be realized that there are a variety of ways in which measuring cups can be mated together other than in the embodiments illustrated in FIGS. 12-19 and 21-22 as long as the smallest cup (i.e., measuring portion 414) of the subset is located on top and the largest cup (i.e., measuring portion 414) of the subset is located on bottom.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A measuring utensil comprising:
   a handle portion; and
   a measuring portion joined to the handle portion, wherein the measuring portion of the measuring utensil nests with a measuring portion of a different measuring utensil;
   wherein the handle portion comprises:
   a main body having an upper surface and a lower surface and defining at least an outer perimeter of the handle portion;
   a male component located within the outer perimeter of the main body and including a proximal end located proximate to the measuring portion, and a distal end, wherein the male component protrudes from the upper surface of the main body to a male engaging surface and wherein a width of the distal end of the male component is greater than a width of the proximal end of the male component; and
   a female component located within the outer perimeter of the main body and recessed from the lower surface of the main body in a direction towards the upper surface of the main body, the female component extending from the lower surface of the main body to a female engaging surface, wherein the female engaging surface is configured to mate with a male engaging surface of a different measuring utensil;
   wherein the female component removably locks together with the male component of a different measuring utensil.

2. The measuring utensil of claim 1, wherein the female component comprises a proximal end, located proximate to the measuring portion, and a distal end, wherein a width of the distal end of the female component is greater than a width of the proximal end of the female component.

3. The measuring utensil of claim 2, wherein the distal ends and the proximal ends of the male and female components comprise radii of curvatures that are substantially similar.

4. The measuring utensil of claim 2, wherein the male component comprises a pair of opposing side edges that extend from the proximal end of the male component to the distal end of the male component, the pair of opposing side edges of the male component each having a radius of curvature, and wherein the female component comprises a pair of opposing side edges that extend from the proximal end of the female component to the distal end of the female component, the pair of opposing side edges of the female component each having a radius of curvature.

5. The measuring utensil of claim 4, wherein the outer perimeter of the main body comprises a pair of opposing side edges each having a radius of curvature, wherein the radius of curvature of each of the pair of opposing side edges of the male and female components is substantially similar to the radius of curvature of the pair of opposing side edges of the outer perimeter of the main body.

6. The measuring utensil of claim 1, wherein the female component extends from the lower surface of the main body of the handle portion to the female engaging surface by a first distance and wherein the male component protrudes from the upper surface of the main body to the male engaging surface by a second distance, the first distance and the second distance being less than a thickness of the main body.

7. A plurality of measuring utensils, each measuring utensil comprising:
   a measuring portion, wherein the measuring portion of each measuring utensil nests with each other;
   a handle portion comprising:
   a main body having an upper surface and a lower surface and defining at least an outer perimeter of the handle portion;
   a male component located within the outer perimeter of the main body and protruding from the upper surface of the main body to a male engaging surface, and
   a female component located within the outer perimeter of the main body and recessed from the lower surface of the main body in a direction towards the upper surface of the main body, the female component extending from the lower surface of the main body to a female engaging surface;

wherein the male components of each of the plurality of measuring utensils are substantially dimensionally similar and the female components of each of the plurality of measuring utensils are substantially dimensionally similar such that each male component removably locks together with each female component and wherein the measuring portions of each of the plurality of measuring utensils are dimensionally different.

8. The plurality of measuring utensils of claim 7, wherein the female components of each of the plurality of measuring utensils are recessed from the lower surface of the main body to the female engaging surface by a first distance and wherein the male components of each of the plurality of measuring utensils protrude from the upper surface of the main body to the male engaging surface, the first distance and the second distance being less than a thickness of the main body.

* * * * *